United States Patent [19]

Lew

[11] Patent Number: 5,044,209

[45] Date of Patent: Sep. 3, 1991

[54] REACTION FORCE FLOWMETER

[76] Inventor: Hyok S. Lew, 7890 Oak St., Arvada, Colo. 80005

[21] Appl. No.: 518,173

[22] Filed: May 3, 1990

Related U.S. Application Data

[63] Continuation-in-part of Ser. No. 477,488, Feb. 9, 1990, and a continuation-in-part of Ser. No. 492,919, Mar. 13, 1990.

[51] Int. Cl.$^5$ .................................................. G01F 1/20
[52] U.S. Cl. .................................. 73/861.72; 73/861.02
[58] Field of Search ........... 73/861.69, 861.72, 861.03, 73/861.02

[56] References Cited

U.S. PATENT DOCUMENTS 3,049,919  8/1962  Roth ................................. 73/861.72
3,538,769  11/1970  Shiba ................................ 73/861.72
3,584,508  6/1971  Shiba ................................ 73/861.72

Primary Examiner—Herbert Goldstein

[57] ABSTRACT

An apparatus for measuring the momentum flow rate of fluid comprises a first conduit extending from one extremity thereof connected to an inlet leg and secured to a support, a second conduit extending from one extremity thereof connected to an outlet leg and secured to a support, and a coupling connecting other extremities of the first and second conduits to one another in an arrangement allowing relative displacement therebetween, wherein a force gauge measures force tending to create the relative displacement between the other extremities of the first and second conduits as a measure of flow rate of fluid moving through a flow passage provided by the combination of the first and second conduits connected to one another by the coupling.

23 Claims, 2 Drawing Sheets

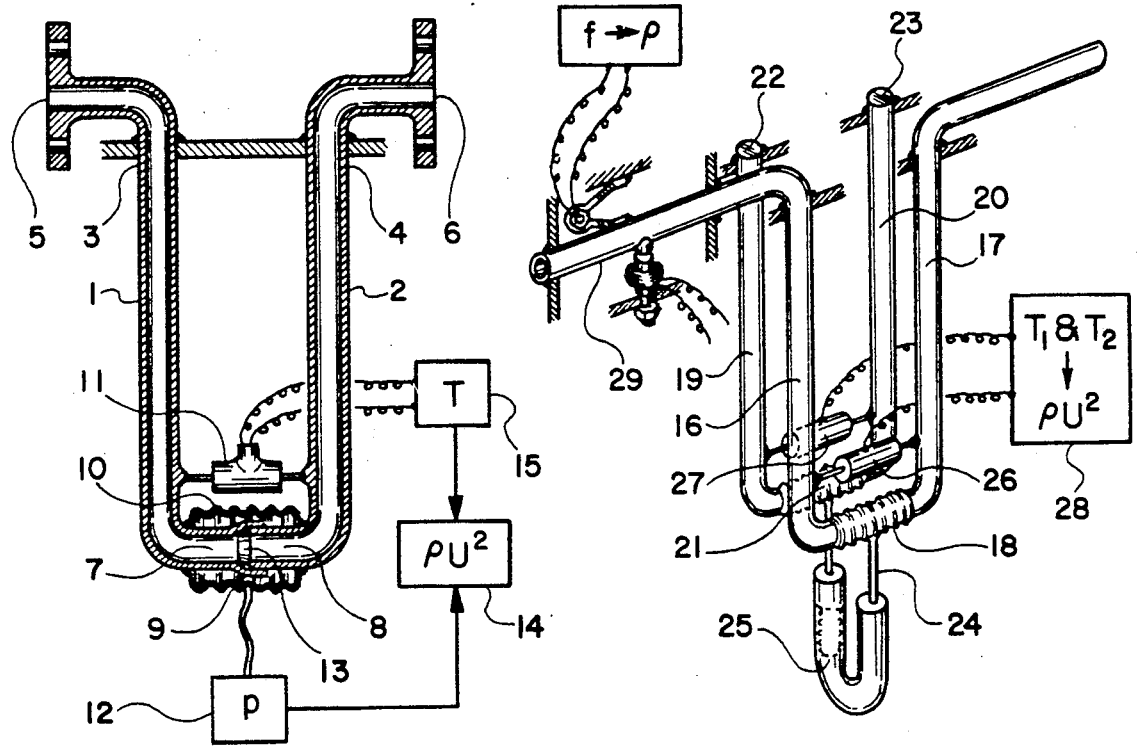
Fig. 1
Fig. 2
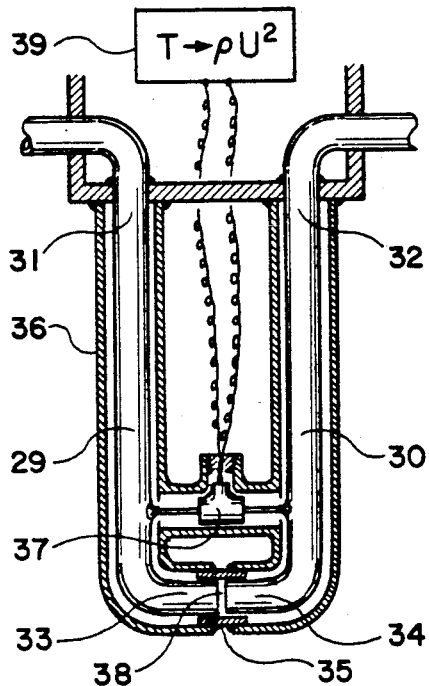
Fig. 3
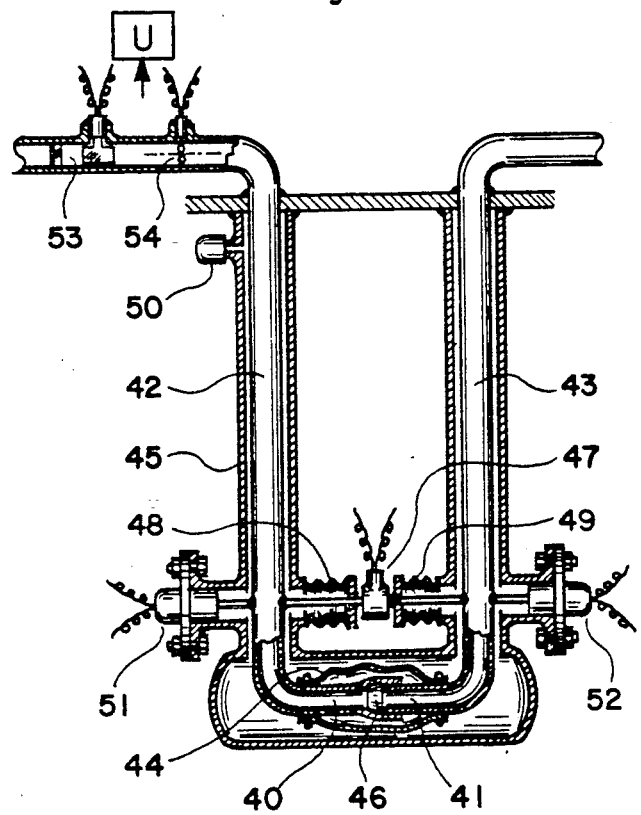
Fig. 4

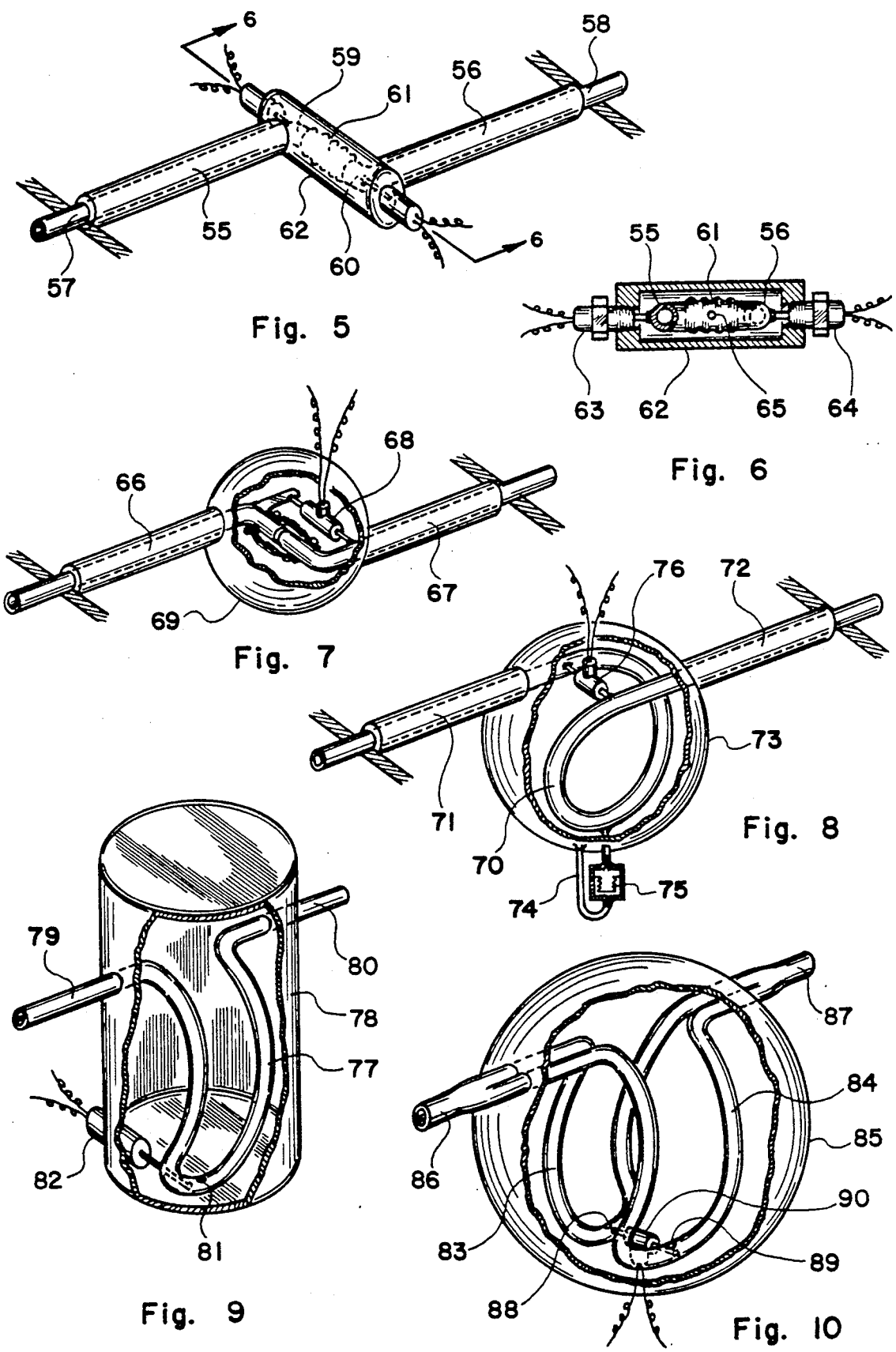

REACTION FORCE FLOWMETER

This is a continuation-in-part application to patent application Ser. No. 477,488 entitled "Inertia Force Flowmeter" filed on Feb. 9, 1990 and patent application Ser. No. 492,919 entitled "Inertia Force Flowmeter" filed on Mar. 13, 1990.

BACKGROUND OF THE INVENTION

A fluid jet exiting from a garden hose or fire hose generates a reaction force of a magnitude equal to the fluid density times the square of the fluid velocity in a direction opposite to the direction of the fluid jet. As the magnitude of the reaction of the fluid flow is proportional to the square of the fluid velocity, the reaction of the fluid flow can be used as a measure of the mass or volume flow rate of fluid, which method is particularly useful in measuring low flow rate of fluid. For example, the minimum velocity of air flow under the standard condition measurable by the best industrial flowmeter available at the present time is in the range of 5 to 10 feet per second. The reaction force of the flow resulting from the air flow at these velocities is in the range of 1 to 4 ounces, which is large enough force readily measurable without using an exotic force measuring device. In general, determining the flow rates of gaseous media with low density from the measured value of the reaction force of the flow that is proportional to the square of the media velocity, provides a definite advantage in measuring low flow rates over other methods involving a direct measurement of the fluid velocity or mass flow rate. As the most cases of the industrial measurements of liquid flows deal with the media velocities greater than 1 foot per second, measuring the square of the velocity in place of the velocity itself does not create any disadvantage in general. In conclusion, a flowmeter determining the flow rates from the reaction force of the flow provides an useful alternative to the existing versions of the flowmeters directly measuring the mass or volume flow rates. While the reaction force created by a fluid jet exiting from the free end of a hose or tubing can be readily felt by a person holding the hose or tubing and easily measured by a simple set up employing a spring balance or other force measuring device, the measurement of the reaction force of the flow of a fluid moving through a continuous conduit as a measure of fluid flow with an accuracy required by the standard of industrial flow measurements demands a novel arrangement and ingenious principles.

BRIEF SUMMARY OF THE INVENTION

The primary object of the present invention is to provide a reaction force flowmeter comprising a pair of over-hanging conduits respectively disposed on two off-set planes and extending from respective secured extremities thereof, wherein the over-hanging extremities of the pair of conduits are connected to one another by a flexible coupling disposed in an angled arrangement to the pair of conduits. The reaction force of the flow proportional to the fluid density times the square of the fluid velocity is determined from a lateral force between the pair of conduits that tends to increase the distance between the pair of conduits.

Another object is to provide the reaction force flowmeter described by the primary object of the present invention, wherein the reaction force of the flow is determined by substracting a portion of the lateral force created by the static pressure of the fluid from the total value of the lateral force tending to increase the distance between the pair of conduits, which portion created by the static pressure of the fluid is determined from the fluid pressure measured by a pressure gauge connected to a midsection of the flexible coupling connecting the pair of conduits.

A further object is to provide the reaction force flowmeter described by the primary object of the present invention, wherein the reaction force of the flow is determined by substracting the pressure portion of the lateral force from the total value of the lateral force tending to increase the distance between the pair of conduits, which pressure portion of the lateral force is determined from the lateral force tending to increase the distance between another pair of conduits connected to one another by a flexible coupling, which combination constructed in the same arrangement as the original pair of conduits has two closed ends and contains a stationary fluid medium at a pressure in balance with the pressure at a midsection of the flexible coupling connecting the original pair of conduits providing the flow passage for the moving fluid medium.

Yet another object is to provide the reaction force flowmeter described by the primary object of the present invention, wherein the combination of the pair of conduits and the flexible coupling is disposed within an enclosure containing a stationary fluid medium at a pressure in balance with the pressure of the moving fluid at a midsection of the flexible coupling connecting the pair of conduits to one another, and the reaction force of the flow is determined from the lateral force tending to increase the distance between the pair of conduits without a pressure compensation.

Yet a further object is to provide a reaction force flowmeter comprising a curved protruding section of a conduit disposed within an enclosure containing a stationary fluid medium at a pressure in balance with the pressure of the moving fluid at a midsection of the curved protruding section of the conduit, wherein the reaction force of the flow is determined from a lateral force experienced by the curved protruding section of the conduit without a pressure compensation.

Still another object is to provide a reaction force flowmeter comprising a pair of curved protruding conduits disposed in a symmetric arrangement about a plane therebetween within an enclosure containing a stationary fluid medium at a pressure in balance with the moving fluid at a midsection of at least one of the two curved protruding conduits providing two parallel flow passages for the moving fluid, wherein the reaction force of the flow is determined from a lateral force tending to increase the distance between the extremities of the two curved protruding conduits without a pressure compensation.

These and other objects of the present invention will become clear as the description of the present invention progresses.

BRIEF DESCRIPTION OF THE FIGURES

The present invention may described with a greater clarity and specificity by referring to the following figures:

FIG. 1 illustrates an embodiment of the reaction force flowmeter of the present invention employing a tension gauge and a pressure gauge.

FIG. 2 illustrates an embodiment of the reaction force flowmeter employing two tension gauges.

FIG. 3 illustrates an embodiment of the reaction force flowmeter employing a single tension gauge.

FIG. 4 illustrates another embodiment of the reaction force flowmeter employing a single tension gauge or a pair of compression gauges.

FIG. 5 illustrates an embodiment of the reaction force flowmeter employing a pair of compression gauges.

FIG. 6 illustrates a cross section of the embodiment shown in FOG. 5.

FIG. 7 illustrates an embodiment of the reaction force flowmeter employing a single tension gauge.

FIG. 8 illustrates another embodiment of the reaction force flowmeter employing a single tension gauge.

FIG. 9 illustrates an embodiment of the reaction force flowmeter comprising a single curved protruding conduit.

FIG. 10 illustrates an embodiment of the reaction force flowmeter comprising a pair of curved protruding conduits.

DESCRIPTION OF THE ILLUSTRATED EMBODIMENTS

In FIG. 1 there is illustrated an embodiment of the reaction force flowmeter of the present invention, which comprises a pair of conduits 1 and 2 respectively extending from the respective secured extremities 3 and 4 adjacent to the inlet 5 and outlet 6 in a generally parallel and over-hanging arrangement. The over-hanging extremities of the conduits 1 and 2 have angled ends 7 and 8, which are connected to one another in a slidable arrangement, wherein a socket 9 included in one of the two angled ends 7 and 8 of the conduits receives the other of the two angled ends 7 and 8 in a sliding relationship. A bellow coupling 10 enclosing the sliding joint of the two angled ends 7 and 8 of the conduits contains the fluid medium moving through the flowmeter within the conduits 1 and 2 and the bellow coupling 10. A tension gauge 11 measures tension between the over-hanging extremities of the conduits 1 and 2 or the lateral force tending to increase the distance between the two conduits 1 and 2. A pressure sensor 12 measures the static pressure of the fluid medium at a section 13 where the angled ends 7 and 8 of the conduits are joined to one another in a sliding relationship, which section generally coincides with the half-way section of the combination of the two angled ends 7 and 8 of the conduits. It should be understood that the coupling connecting the angled ends 7 and 8 of the conduits 1 and 2 may include the bellow coupling 10 without the socket 9 guiding the sliding movement.

It can be readily shown that the tension T measured by the tension gauge 11 is related to the fluid velocity and the pressure of the fluid by equation $$T = (\rho U^2 + p_m)A + T_0,  \quad (1)$$

where $\rho$ is the fluid density, U is the fluid velocity, $p_m$ is the static gauge pressure of the fluid measured at the half-way section of the combination of the angled ends 7 and 8 of the conduits, A is the cross section area of the flow passage provided by the combination of the angled ends of the conduits and $T_0$ is the initial tension between the two over-hanging extremities of the conduits 1 and 2 measured under zero flow and zero gauge pressure. Equation (1) can be written in the form $$\rho U^2 = \frac{T - T_0}{A} - p_m. \quad (2)$$

The data processor 14 computes the reaction force of the flow $\rho U^2$ from the value of the tension provided by the tension indicator 15 and the pressure value provided by the pressure indicator 12 per equation (2). In actual operation, an empirically determined equation relating the tension and pressure values to the reaction force may be used in place of equation (2). For a fluid with density of known value, the mass and/or volume flow rates are readily determined from the reaction force $\rho U^2$. For a fluid with variable density, a density meter or volume flowmeter is employed in conjunction with the reaction force flowmeter as shown in FIGS. 2 and 4, wherein a combination of the density and the reaction force or a combination of the fluid velocity and the reaction force provides the mass and/or volume flow rates of the fluid.

Equations (1) and (2) are valid when the conduits 1 and 2 are disposed in a symmetric arrangement with respect to one another. In general, the two halves of the test conduit connected to one another at the midsection in a relatively displaceable arrangement should be symmetric to one another.

In FIG. 2 there is illustrated another combination of the reaction force flowmeter, that comprises a first combination of the pair of over-hanging conduits 16 and 17 with angled ends coupled to one another by an axially flexible coupling 18, which combination providing a flow passage has the same construction as that of the embodiment shown in FIG. 1, and a second combination of the pair of over-hanging conduits 19 and 20 with angled ends coupled to one another by an axially flexible coupling 21, which second combination of the pair of conduits has the same construction as the first combination except the closed ends 22 and 23. A fluid medium contained within the second combination of the closed conduits 19 and 20 is pressurized to the same pressure as the static pressure of fluid medium moving through the flow passage provided by the first combination of the conduits 16 and 17, which static pressure exists at a half-way section of the combination of the angled ends of the pair of conduits 16 and 17, as a pressure line 24 extending from the bellow coupling 18 transmits the static pressure of the fluid medium in the flow passage to the fluid medium trapped in the combination of the conduits 19 and 20 across a flexible barrier 25 as shown in the particular illustrated embodiment or directly in a modified embodiment. The reaction force is determined from the two tension values $T_1$ and $T_2$ respectively measured by the two tension gauges 26 and 27 by the following theoretical equation:

$$\rho U^2 = \frac{T_1 - T_2}{A}, \quad (3)$$

or by an empirically obtained equation equivalent to the theoretical equation (3). The data processor 28 determines the reaction force from the measured tensions $T_1$ and $T_2$. When the fluid has a variable density, a density meter such as a vibrating conduit densitometer 29, that determines the fluid density from the natural frequency of the flexural vibration of the conduit, may be employed in series with the reaction force flowmeter in order to determine the fluid density, whereby the mass and/or volume flow rates can be determined from a combination of the measured value of the fluid density and the reaction force of the flow. In place of the densitometer, a volumetric flowmeter may be employed in series with the reaction force flowmeter as shown in FIG. 4.

In FIG. 3 there is illustrated a further embodiment of the reaction force flowmeter comprising a pair of conduits 29 and 30 respectively extending from anchored extremities 31 and 32, wherein the angled ends 33 and 34 thereof are joined in a free-sliding arrangement by a guide sleeve 35 affixed to a rigid enclosure 36 that encloses the combination of the pair of conduits 29 and 30 and a tension gauge 37 measuring the force tending to increase the distance between the two conduits 29 and 30, which enclosure is filled with the same fluid medium as that moving through the flow passage provided by the pair of conduits 29 and 30 and pressurized to the static pressure of the fluid medium moving through the flow passage at the section 38 whereat the angled ends 33 and 34 of the conduits are joined. As the conduits 29 and 30 are immersed in a fluid bath of pressure $p_m$, the pressure term in equation (2) drops out and the following equation results in:

$$\rho U^2 = \frac{T - T_0}{A}. \quad (4)$$

The data processor 39 determines the reaction force $\rho U^2$ from the measured value of tension T per the theoretical equation (4) or from an empirical equation of the following from:

$$\rho U^2 = C(T - T_0), \quad (5)$$

where C is an empirically determined coefficient of proportionality that may be linear or nonlinear depending on the construction of the reaction force flowmeter.

In FIG. 4 there is illustrated yet another embodiment of the reaction force flowmeter having a construction similar to and operating on the same principles as that of the embodiment shown in FIG. 3. In this embodiment, the sliding joint between the two angled ends 40 and 41 of the conduits 42 and 43 is enclosed within an inflatable leak-proof barrier 44 that separates the fluid trapped within the enclosure 45 from the fluid moving through the combination of the two conduits 42 and 43, wherein the static pressure of the fluid moving through the flow passage provided by the combination of the conduits 42 and 43 pressurizes the trapped fluid to the static pressure of the moving fluid existing at the section 46 whereat the two angled ends 40 and 41 are joined in a slidable arrangement. The tension gauge 47 is connected to the over-hanging extremities of the two conduits 42 and 43 by a pair of elongated members respectively extending through flexible barriers 48 and 49 forming portions of the wall of the enclosure 45 and anchored to the two conduits 42 and 43, respectively. The enclosure 45 has a refill cork 50 for filling or draining the fluid trapped therein. In place of the tension gauge 47, a pair of compression gauges 51 and 52 respectively measuring the lateral force experienced by the over-hanging extremities of the two conduits 42 and 43 may be employed, wherein difference between compression values respectively measured by the two compression gauges provides the tension T appearing in equation (4) or (5). A device measuring the fluid velocity such as a vortex shedding flowmeter 53 or a turbine flowmeter 54 may be installed in series with the reaction force flowmeter in order to determine the mass and/or volume flow rates of a fluid with variable density, which measures the fluid velocity U, that is substituted into the measured value of the reaction force to determine the fluid density and/or fluid velocity. Of course, a densitometer can be employed in conjunction with the reaction force flowmeter in place of a volumetric flowmeter as shown in FIG. 2.

In FIG. 5 there is illustrated yet a further embodiment of the reaction force flowmeter, which illustrates a modified version of the embodiments shown in FIGS. 3 and 4. In this embodiment, the two conduits 55 and 56 respectively disposed on two planes off-set from one another extend towards one another from respective anchored extremities 57 and 58, wherein the angled ends 59 and 60 thereof are joined in a slidable arrangement by one of many sliding joint embodiments shown in FIGS. 1, 3 and 4. In the particular illustrated embodiment, an axially free-sliding coupling 61 such as that shown in FIG. 1 is employed. The combination of the conduits 55 and 56 and the free-sliding coupling 61 is enclosed within a rigid enclosure 62 that contains a fluid medium pressurized to the static pressure of the medium moving through the conduit existing at a section whereat the two angled ends 59 and 60 of the conduits are joined. It should be mentioned that not only the embodiments shown in FIGS. 3 and 4 but also those shown in FIGS. 1 and 2 can be modified to the type of arrangement of the conduit shown in FIG. 5.

In FIG. 6 there is illustrated a cross section of the embodiment shown in FIG. 5, which cross section taken along plane 6—6 as shown in FIG. 5 shows a pair of compression sensors 62 and 63 disposed in line with the central axis of the free-sliding coupling 61, which respectively measure the lateral force experienced by the over-hanging extremities of the two conduits 55 and 56. The hole 65 through the bellow coupling 61 pressurizes the fluid medium trapped within the rigid enclosure 62 to the static pressure of the moving medium existing at the half-way section of the free-sliding coupling. The pair of compression gauges 63 and 64 can be replaced by a single tension gauge as shown in FIG. 7. The reaction force is determined by equation (4) or (5), wherein the difference between the two tension values respectively measured by the two compression gauges 63 and 64 provides the tension.

In FIG. 7 there is illustrated still another embodiment of the reaction force flowmeter that has essentially the same construction as the embodiment shown in FIG. 7 with a few exception. In this particular embodiment, the angled ends of the two conduits 66 and 67 are joined by a free-sliding coupling of the type employed in the construction of the embodiment shown in FIG. 4. The tension between the over-hanging extremities of the two conduits 66 and 67 or the lateral force tending to increase the distance between the over-hanging extremities of the two conduits 66 and 67 is measured by a tension gauge 68. The mid-portion of the rigid enclosure includes a spherical enclosure 69 in place of the cylindrical enclosure included in the embodiment shown in FIG. 5.

In FIG. 8 there is illustrated still a further embodiment of the reaction force flowmeter having essentially the same construction as that shown in FIG. 7 with one exception, that is the looped section 70 of the conduit connecting two over-hanging sections 71 and 72 of the conduit, which looped section 70 is disposed on a plane intermediate two planes respectively including the two over-hanging sections 71 and 72 of the conduit. The pressure of the fluid medium filling the rigid enclosure 73 is matched to the pressure of the moving fluid medium existing at the half-way section of the looped section 70 of the conduit, which pressure matching is accomplished by means of pressure line 74 including a flexible barrier 75, that prevents the two fluids from mixing. Of course, the pressure matching can be also accomplished by a pressure hole through the wall of the conduit disposed at the half-way section of the looped section 70 of the conduit, wherein the same fluid as the fluid moving through the conduit fills the rigid enclosure 73. The tension gauge 76 measures the lateral force tending to increase the distance between the over-hanging extremities of the two over-hanging sections 71 and 72 of the conduit. The reaction force of the flow is determined from the tension measured by the tension gauge 76 per equation (5). It should be mentioned that a looped section of a loop angle generally equal to 540 degree disposed on a plane intermediate the two over-hanging conduits shown in FIGS. 1, 2, 3 or 4 can be used to connect them to one another, which looped section replaces the combination of the two angled ends of the conduits and the free-sliding coupling employed in those embodiments.

In FIG. 9 there is illustrated an embodiment of the reaction force flowmeter comprising a curved protruding section 77 of the conduit disposed within the rigid enclosure 78 intermediate the inlet and outlet sections 79 and 80 extending through the wall of the rigid enclosure 78. The midsection of the over-hanging extremity of the curved protruding section 77 includes a hole 81 that supplies and pressurizes the fluid medium contained within the rigid enclosure 78. Of course, the pressure communicating means including the flexible barrier such as that included in the embodiment shown in FIG. 8 may be employed in place of the pressure hole 81. The tension gauge 82 anchored to the wall of the rigid enclosure 78 and connected to the midsection of the curved protruding conduit 77 measures the reaction force of the flow that tends to reduce the curvature of the curved protruding conduit. The reaction force of the flow is determined from the measured value of the tension per equation (5). In using the reaction force flowmeter shown in FIG. 9 in measuring reaction force of a fluid flow with a heavy density such as a liquid, the curved protruding section of the conduit must be disposed in an appropriate angle relative to the vertical direction in such a way that the earth's gravitational force does not contribute to the tension measured by the tension gauge 82.

In FIG. 10 there is illustrated an embodiment of the reaction force flowmeter comprising a pair of curved protruding conduits 83 and 84 disposed within a rigid enclosure 85 in a symmetric arrangement about a plane intermediate the two curved protruding conduits 83 and 84, which two curved protruding conduits equally divide the fluid flow entering and leaving the common end sections 86 and 87 of the conduit extending through the wall of the rigid enclosure 85. At least one of the two curved protruding conduits 83 and 84 has a pressure hole 88 and 89 disposed at the half-way section thereof. Of course, the simple pressure hole can be replaced by a pressure communicating line including a flexible barrier employed in the embodiment shown in FIG. 8. A tension gauge 90 measures tension between the over-hanging extremities of the two curved protruding conduits 83 and 84, which tension determines the reaction force of the flow per equation (5). This particular embodiment provides a greater flexibility than the embodiment shown in FIG. 9 in terms of installation position wherein the earth's gravitational force does not introduce an error in measuring the reaction force of the flow.

While the principles of the present inventions have now been made clear by the illustrative embodiments, there will be many modifications of the structures, arrangements, proportions, elements and materials obvious to those skilled in the art, which are particularly adapted to the specific working environments and operating conditions in the practice of the inventions without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention, in which an exclusive property or privilege is claimed, are defined as follows:

1. An apparatus for measuring reaction force of flow as a measure of flow rate of media comprising in combination:
   a) an enclosure vessel;
   b) at least one curved protruding conduit with two extremities respectively connected to an inlet and outlet legs disposed within the enclosure vessel, wherein the inlet and outlet legs extend out of the enclosure vessel through the wall thereof in a leak-proof manner;
   c) a pressure transmitting means transmitting pressure of fluid existing at a midsection of the curved protruding conduit to fluid contained in the enclosure vessel; and
   d) means for measuring a force tending to change curvature of the curved protruding conduit as a measure of the flow rate of fluid moving through the curved protruding conduit.

2. The combination as set forth in claim 1 wherein said combination includes means for determining momentum flow rate of the fluid from said force.

3. An apparatus for measuring reaction force of flow as a measure of flow rate of media comprising in combination:
   a) an enclosure vessel;
   b) a pair of curved protruding conduits having a common inlet and outlet legs disposed within the enclosure vessel in a symmetric arrangement about a plane intermediate the pair of curved protruding conduits, wherein the inlet and outlet legs extend out of the enclosure vessel through the wall thereof in a leak-proof manner;
   c) a pressure transmitting means transmitting pressure of fluid existing at a midsection of at least one of the pair of curved protruding conduits to fluid contained in the enclosure vessel; and
   d) means for measuring a force tending to create a relative displacement between over-hanging extremities of the pair of curved protruding conduits as a measure of flow rate of the fluid moving through the pair of curved protruding conduits.

4. The combination as set forth in claim 3 wherein said combination includes means for determining momentum flow rate of the fluid from said force.

5. The combination as set forth in claim 4 wherein said apparatus is installed in combination with an apparatus measuring density of the fluid, wherein flow rate of the fluid is determined from a combination of the momentum flow rate of the fluid determined by said means and density of the fluid measured by said density measuring apparatus.

6. The combination as set forth in claim 4 wherein said apparatus is installed in combination with an apparatus measuring volume flow rate of the fluid, wherein mass flow rate of the fluid is determined from a combination of the momentum flow rate of the fluid determined by said means and volume flow rate of the fluid measured by said volume flow rate measuring apparatus.

7. An apparatus for measuring reaction force flow as a measure of flow rate of media comprising in combination:
   a) a first conduit extending from one extremity thereof connected to an inlet leg and secured to a support, and including a bend at the other extremity opposite to said one extremity; and a second conduit extending from one extremity thereof connected to an outlet leg and secured to a support, and including a bend at other extremity opposite to said one extremity, wherein said first and second conduits are disposed in a symmetric arrangement with respect to one another and the other extremities of said first and second conduits are connected to one another by a coupling allowing a relative displacement therebetween;
   b) means for measuring pressure of media contained in the combination of the first and second conduits existing at a midsection of said combination of the first and second conduits;
   c) means for measuring a force tending to create relative displacement between the other extremities of the first and second conduits; and
   d) means for determining momentum flow rate of the media from said force tending to create said relative displacement minus a portion of said force created by the pressure of media determined from said measured pressure of the media existing at said midsection of the combination of the first and second conduits.

8. A combination as set forth in claim 7 wherein said coupling allowing the relative displacement comprises an axially compressible and extendable coupling.

9. A combination as set forth in claim 8 wherein said apparatus is installed in combination with an apparatus measuring density of the media, wherein flow rate of the media is determined from a combination of the momentum flow rate and the density of the media.

10. A combination as set forth in claim 8 wherein said apparatus is installed in combination with an apparatus measuring volume flow rate of the media, wherein mass flow rate of the media is determined from a combination of the momentum flow rate and the volume flow rate of the media.

11. A combination as set forth in claim 7 wherein said coupling allowing the relative displacement comprises a curved conduit disposed substantially on a plane generally perpendicular to a plane including the first and second conduits.

12. A combination as set forth in claim 11 wherein said apparatus is installed in combination with an apparatus measuring density of the media, wherein flow rate of the media is determined from a combination of the momentum flow rate and the density of the media.

13. A combination as set forth in claim 11 wherein said apparatus is installed in combination with an apparatus measuring volume flow rate of the media, wherein mass flow rate of the media is determined from a combination of the momentum flow rate and the volume flow rate of the media.

14. A combination as set forth in claim 7 wherein said means for determining momentum flow rate includes a third conduit extending from one closed extremity thereof secured to a support and including a bend at other extremity opposite to said one extremity; and a fourth conduit extending from one closed extremity thereof and secured to a support and including a bend at other extremity opposite to said one extremity, wherein said third and fourth conduits are disposed in a symmetric arrangement with respect to one another and the other extremities of said third and fourth conduits are connected to one another by a coupling allowing a relative displacement; and said combination of the third and fourth conduits is pressurized by said pressure of the media existing at the midsection of the combination of the first and second conduits, and further includes means for measuring a force tending to create relative displacement between the other extremities of said third and fourth conduits; wherein the force between the other extremities of the first and second conduits minus a portion of said force created by the pressure of media is determined from a differential combination of said force between the other extremities of the first and second conduits and said force between the other extremities of the third and fourth conduits.

15. A combination as set forth in claim 14 wherein said apparatus is installed in combination with an apparatus measuring density of the media, wherein flow rate of the media is determined from a combination of the momentum flow rate and the density of the media.

16. A combination as set forth in claim 14 wherein said apparatus is installed in combination with an apparatus measuring volume flow rate of the media, wherein mass flow rate of the media is determined from a combination of the momentum flow rate and the volume flow rate of the media.

17. An apparatus for measuring reaction force of flow as a measure of flow rate of media comprising in combination:
   a) an enclosure vessel;
   b) a first conduit extending from one extremity thereof connected to an inlet leg and secured to a support, and including a bend at the other extremity opposite to said one extremity; and a second conduit extending from one extremity thereof connected to an outlet leg and secured to a support, and including a bend at the other extremity opposite to said one extremity, wherein said first and second conduits are disposed in a symmetric arrangement with respect to one another within the enclosure vessel and the other extremities of said first and second conduits are lined up to one another by a coupling allowing a relative displacement therebetween;
   c) a pressure transmitting means for transmitting pressure of media contained in the combination of the first and second conduits existing at a midsection of said combination of the first and second conduits to fluid contained in the enclosure vessel;

d) means for measuring a force tending to create relative displacement between the other extremities of the first and second conduits; and e) means for determining momentum flow rate of the media from said force tending to create said relative displacement.

18. A combination as set forth in claim 17 wherein said apparatus is installed in combination with an apparatus measuring density of the media, wherein flow rate of the media is determined from a combination of the momentum flow rate and the density of the media.

19. A combination as set forth in claim 17 wherein said apparatus is installed in combination with an apparatus measuring volume flow rate of the media, wherein mass flow rate of the media is determined from a combination of the momentum flow rate and the volume flow rate of the media.

20. A combination as set forth in claim 17 wherein the other extremities of the first and second conduits are mated to one another in a slidable arrangement.

21. A combination as set forth in claim 17 wherein the other extremities of the first and second conduits are connected to one another by an inflatable tubular member.

22. A combination as set forth in claim 17 wherein the other extremities of the first and second conduits are connected to one another by an axially compressible and extendable coupling.

23. A combination as set forth in claim 17 wherein the other extremities of the first and second conduits are connected to one another by a curved conduit disposed substantially on a plane generally perpendicular to a plane including the first and second conduits.

* * * * *